United States Patent Office.

JOHN STANTON, OF BALDWINSVILLE, NEW YORK.

PROCESS OF MAKING NEGATIVES.

SPECIFICATION forming part of Letters Patent No. 533,322, dated January 29, 1895.

Application filed December 15, 1893. Serial No. 493,767. (Specimens.)

*To all whom it may concern:*

Be it known that I, JOHN STANTON, a citizen of the United States, residing at Baldwinsville, in the county of Onondaga, in the State of New York, have invented new and useful Improvements in Processes of Making Negatives, of which the following is a full, clear, and exact description.

My invention relates to a new process of forming designs or representations upon a plate or body of more or less transparency and is particularly applicable for manufacturing negatives for use in printing upon a sensitized surface as one intended for etching, and it consists in certain modes of operation, all as hereinafter more fully described and set forth in the claim.

Designs or representations have heretofore been produced upon transparent plates or bodies by the use of a specially prepared drawing ink or fluid designed to prevent the adhesion of coloring matter to the portion of the plate or body underlying said ink and to chemically unite with a developing fluid for effecting the removal of said ink and the coloring matter thereupon. Inks of this character are more or less oily or gummy, do not possess the desired fluency, are subject to chemical change, variation and deterioration, are liable to lose their potency when unequally distributed, and are more or less uncertain and unreliable in action.

By my process I mark or form the pattern in an ordinary drawing ink or fluid, as India or French ink, which is readily and uniformly distributed, is easily obtainable, and is subject to a minimum degree of variation and deterioration. The plate or body to be provided with the design or representation by my process, may consist of celluloid or other suitable material. The pattern is marked thereon by ordinary drawing ink or fluid, as India or French ink, and this result is ususlly facilitated by placing the plate or body over the design or representation which the pattern is intended to reproduce, and tracing said design or representation.

Before the ink in which the pattern is marked is thoroughly dry, the surface to be decorated or provided with the design or representation is coated with a mixture of an oil and a drier. I preferably use lavender oil and mix about three parts by bulk thereof with one part of the drier, although other suitable oils may be used. The surplus mixture is then drained or otherwise removed from the plate or body and the surface thereof to be decorated is covered with a finely divided coloring matter as powdered crayon or lamp black which forms the groundwork of the design or representation and may be thoroughly mixed with the oil or drier by the fingers or a suitable tool, and then pounced with a wad of cotton or similar material. It is evident that the coloring matter may be mixed with the oil and drier before the application thereof to the transparent plate or body and that this variation in the steps of my process is no material departure from my invention. Before the surface as thus treated has become thoroughly hard I moisten the same with ammonia or any other suitable caustic agent which may be applied by a wad of cotton or a suitable tool. As the ammonia is wiped gently over the surface the color immediately overlying the pattern and the dried ink forming the pattern is removed exposing the surface of the celluloid or other transparent plate or body. The color applied to the remaining portion of the surface of the plate or body is unaffected by the ammonia, and after becoming dry said plate or body is suitable for use as a negative.

This process is particularly simple, practical and effective, the pattern as previously stated is marked in an ordinary drawing ink or fluid, is readily and easily produced without difficulty of procurement of the ink or fluid or liability of its variation or deterioration or of ununiformity in the results effected by my process. Negatives produced in this manner are particularly applicable for use in the manufacture of cuts for newspapers and similar publications and lessen materially the time and cost heretofore necessitated in their production.

Having thus fully described my invention, what I claim as new, and desire to secure by Letters Patent, is—

The herein described method of producing designs upon a substantially transparent plate or body, the same consisting in marking the pattern upon the plate or body in India ink or its equivalent, covering the entire surface to be decorated with a mixture of an oil and a drier, mixing a powdered coloring material in the covering of the oil and drier, and finally removing the ground work material lying upon the pattern by dissolving in ammonia the ink in which the pattern is marked, substantially as set forth.

In witness whereof I have hereunto set my hand this 12th day of December, 1893.

JOHN STANTON.

In presence of—
 MAHLON D. VOORHEES,
 FRED A. MARVIN.